(12) United States Patent
Dong

(10) Patent No.: US 8,161,189 B2
(45) Date of Patent: Apr. 17, 2012

(54) METHOD FOR PROVIDING A UICC WITH AN OPERATOR DNS IP ADDRESS

(75) Inventor: Olivier Dong, Tokyo (JP)

(73) Assignee: NEC Corporation, Tokyo (JP)

(*) Notice: Subject to any disclaimer, the term of this patent is extended or adjusted under 35 U.S.C. 154(b) by 57 days.

(21) Appl. No.: 12/529,890

(22) PCT Filed: Mar. 5, 2008

(86) PCT No.: PCT/JP2008/054428
§ 371 (c)(1),
(2), (4) Date: Sep. 3, 2009

(87) PCT Pub. No.: WO2008/126576
PCT Pub. Date: Oct. 23, 2008

(65) Prior Publication Data
US 2010/0138525 A1    Jun. 3, 2010

(30) Foreign Application Priority Data

Mar. 19, 2007 (EP) .................................. 07104399

(51) Int. Cl.
*G06F 15/173* (2006.01)

(52) U.S. Cl. ........................ 709/238; 709/239; 713/152
(58) Field of Classification Search .................. 709/238, 709/239; 713/152
See application file for complete search history.

(56) References Cited

U.S. PATENT DOCUMENTS

| 7,647,493 B2* | 1/2010 | Bajko et al. ................... 713/152 |
| 2006/0095546 A1* | 5/2006 | Saaranen et al. ............... 709/220 |
| 2007/0060097 A1* | 3/2007 | Edge et al. ................. 455/404.1 |

FOREIGN PATENT DOCUMENTS

| JP | 2005045418 A | 2/2005 |
| JP | 2006197107 A | 7/2006 |
| WO | 2004095812 A | 11/2004 |

OTHER PUBLICATIONS

International Search Report for PCT/JP2008/054428 mailed Jul. 1, 2008.

* cited by examiner

*Primary Examiner* — Adnan Mirza

(57) ABSTRACT

A method for providing a UICC embedded in a wireless Mobile Equipment (ME) with an operator DNS IP address in a Wireless communication Network, said method comprising the following steps:
- defining a specific Mobile Equipment (ME) event that the UICC may monitor,
- defining a new data structure that will comprise the DNS IP address to be sent to the UICC,
- registering the UICC to said event via predefined Setup Event List proactive command,
- generating said specific event by said ME when a PDP context is activated between the ME and the Network,
- including the DNS IP address in said new data structure,
- sending said new data structure (including the DNS IP address) from the ME to the UICC via a new Envelop command when said generated event occurs.

8 Claims, 1 Drawing Sheet

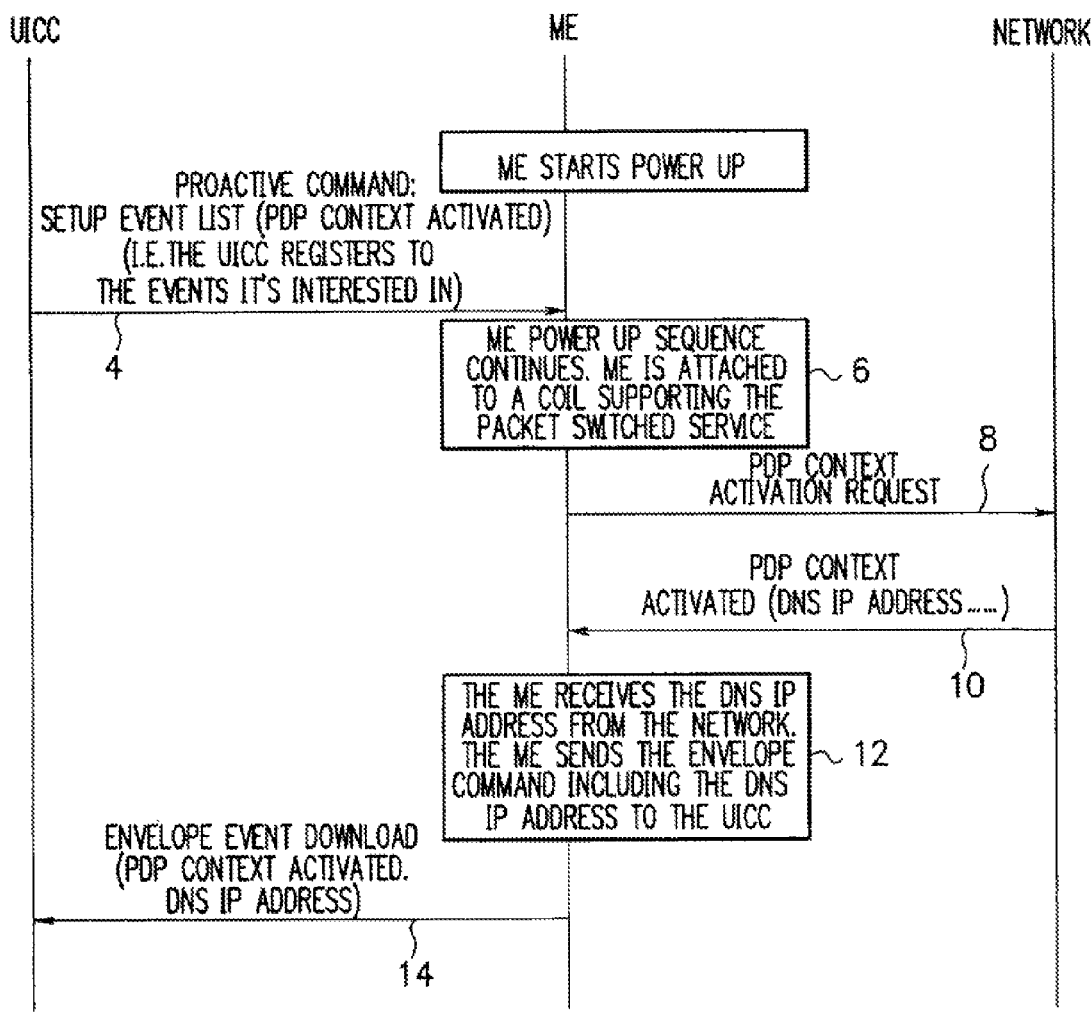

METHOD FOR PROVIDING A UICC WITH AN OPERATOR DNS IP ADDRESS

This application is the National Phase of PCT/JP2008/054428, filed Mar. 5, 2008, which is based upon and claims priority from European Patent Application No. 07104399.6 filed Mar. 19, 2007.

TECHNICAL FIELD

The present invention pertains to wireless telecommunication field and concerns specifically a method for providing a UICC (Universal Integrated Circuit Card) embedded in a wireless Mobile Equipment (ME) with an operator DNS IP address in a Wireless communication Network.

DESCRIPTION OF THE RELATED ART

It is expected that in ETSI SCP Re1-7, the UICC will include an own TCP/IP stack that would provide the UICC with a internet connectivity solution. Generally, any application sitting above the TCP/IP stack needs a name resolution service in order to get the destination server IP address.

Up to now, the pre-re17 internet connectivity solution for Application located in the UICC consists in using the BIP (for Bearer Interface Protocol) on the Mobile Equipment-UICC interface. This protocol is based on data encapsulation into APDU commands.

For example, an http request from an application located in the UICC (to be sent to the network) could be divided into several data blocks; each block is carried by one APDU command (Send Data) on the ME-UICC interface. The ME will reconstitute the initial http request from the UICC once it will have received all the APDU commands (Send Data), and then sends the request to the network.

This BIP protocol could actually imply a significant number of operations before the UICC request is sent to the Network. Therefore, its performance is quite low compared with a TCP/IP interface between the ME and the UICC.

If the DNS IP address is not known by the UICC, then it shall rely on the ME to provide it with this name resolution service, which would deteriorate the interest of having a TCP/IP stack in the UICC.

One object of the invention is to make the UICC to behave, from the appreciative point of view, as a ME-independent client/server entity for remote entities.

SUMMARY OF THE INVENTION

The exemplary object of the invention is achieved by means of a method aimed at providing a UICC embedded in a wireless Mobile Equipment (ME) with network information such as the Network operator DNS IP address in order to make said UICC to behaviour like any other TCP/IP network element in a Wireless communication Network.

The method according to the invention comprises the following steps:
- defining a specific Mobile Equipment (ME) event that the UICC may monitor,
- defining a new data structure that will comprise the DNS IP address to be sent to the UICC,
- registering the UICC to said event via predefined Setup Event List proactive command,
- generating said specific event by said ME when a PDP context is activated between the ME and the Network, including the DNS IP address in said new data structure,
- sending said new data structure including the DNS IP address from the ME to the UICC via a new Envelop command when said generated event occurs.

Thanks to the method according to the invention, the UICC will be seen as a network entity and can hold a number of elements itself including DNS.

BRIEF DESCRIPTION OF THE DRAWING

FIG. 1 represents a diagram which shows how the DNS IP address could be sent to the UICC during power up sequence in an exemplary embodiment according to the present invention.

BRIEF DESCRIPTION OF THE EXEMPLARY EMBODIMENT

The forgoing summary, as well as the following detailed description, will be better understood when read in conjunction with the appended FIGURE representing a diagram showing how the DNS IP address could be sent to the UICC during the power up sequence.

It is to be noted that in ETSI re1-7, there will be two physical interfaces between the UICC and the Mobile Equipment ME: ISO 7816 based interface, and USB, also called High Speed interface.

The method according to the invention provides a solution for both interfaces and will be based on the (U)SIM toolkit proactive commands mechanism.

For the ISO interface, the solution consists in creating a new ME event (e.g. PDP context activated) that the UICC can monitor via the predefined Setup Event List proactive command. When the PDP context will be activated, this event will be generated, and an Envelop command will notify the UICC about the occurrence of this event.

The data included in the Envelop command contain the DNS IP address.

The following table gives a description of the Data Object "Event List" in an ETSI TS 102.223 implementation of the invention:

| Byte(s) | Description | Length |
|---|---|---|
| 1 | Event list tag | 1 |
| 2 to Y + 1 | Length(X) of bytes following | Y |
| Y + 2 to X + Y + 1 | Event list | X |

The Data Object "Event List" comprises a list of events, of variable length. Each byte in the list defines an event. Each event type shall not appear more than once within the list.

In this embodiment of the invention, a new event "PDP context activated (e.g. 0×12)" is added in the Data Object and each byte in the event list shall be coded with one of the values below:
 '00'=MT call;
 '01'=Call connected;
 '02'=Call disconnected;
 '03'=Location status;
 '04'=User activity;
 '05'=Idle screen available;
 '06'=Card reader status;
 '07'=Language selection;
 '08'=Browser termination;
 '09'=Data available;
 '0A'=Channel status;
 '0B'=Access Technology Change;

'0C'=Display parameters changed;
'0D'=Local connection;
'0E'=Network Search Mode Change;
'0F'=Browsing status;
'10'=Frames Information Change.
'11'=reserved for 3GPP (I-WLAN Access Status).
'12'=PDP Context Activated.

Following is a table giving the new Envelope (EVENT DOWNLOAD-PDP contest activated) Command parameters/data structure:

| Description | Clause | M/O/C | Min | Length |
|---|---|---|---|---|
| Event download tag | 9.1 in TS 102.223 | M | Y | 1 |
| Length (A + B + C) | — | M | Y | 1 or 2 |
| Event list | 8.25 in TS 102.223 | M | Y | A |
| Device identities | 8.7 in TS 102.223 | M | Y | B |
| DNS IP Address | new clause to be added in TS 102.223 | M | Y | C |

The event list object shall contain only one event (value part of length 1 byte), and ME shall set the event to: "PDP context activated".

Device identities:
source: ME;
destination: UICC

Following is a table giving the DNS IP address structure:

| Byte(s) | Description | Length |
|---|---|---|
| 1 | DNS IP address tag (e.g.: 0x71 or 0xF1) | 1 |
| 2 | Length(X) | 1 |
| 3 | Type of address | 1 |
| 4 to (X + 2) | Address | X − 1 |

The parameter type of address is coded as follows:
'21'=IPv4 address;
'57'=IPv6 address;
'others'=reserved.

Coding of address:
If the parameter type of address indicates IPv4, the Address information in octet 4 to octet 7 contains the IPv4 address. Bit 8 of octet 4 represents the most significant bit of the IP address and bit 1 of octet 7 the least significant bit.

If the parameter type of address indicates IPv6, the Address information in octet 4 to octet 19 contains the IPv6 address. Bit 8 of octet 4 represents the most significant bit of the IP address and bit 1 of octet 19 the least significant bit.

For the USB interface, the solution consists in encapsulating APDU commands into USB data frames according to the mechanism described in ISO 7816-12 specifications. The only difference is that the APDU commands (Setup Event List, Envelope) will be encapsulated into USB data frames and are sent over the USB physical interface instead of the ISO interface.

The Diagram represented in FIG. 1 shows how the DNS IP address could be sent to the UICC during the power up sequence.

At step 2, the ME starts power up. The UICC transmits to the ME (arrow 4) a proactive command "Setup Event List (PDP context Activated)" allowing the UICC to register to the PDP context activation event.

On reception of said request, the ME saves this information in its context. If the ME is attached to a cell supporting the Packet Switched service (part of the power up sequence, arrow 6), the ME will request the PDP context activation (arrow 8).

On reception of said request, the Network activates the PDP context and sends back (arrow 10) to the ME a data structure in which the DNS IP address has been included.

By receiving the PDP context activation reply (PDP context activated) from the Network, an event is generated in the ME.

When the event generated by the ME occurs, the ME sends the DNS IP address to the UICC via a new Envelope command (Event Download, PDP context activated).

It is to be noted that the PDP context activation sequence could be done at any moment and not necessarily during the power up phase as shown in the example diagram here.

In a first embodiment of the invention, the DNS IP address is sent to the UICC via an ISO 7816 based interface.

In a second embodiment of the invention, the DNS IP address is encapsulated into USB data frames and sent to the UICC over a USB physical interface.

In a preferred embodiment, the method according to the invention further comprises:
adding a event "PDP Context Activated" in the "Event List" COMPREHENSION-TLV data object as defined in ETSI TS 102 223,
adding a new Envelope command: (EVENT DOWNLOAD-PDP context activated),
adding a new "DNS IP ADDRESS" COMPREHENSION-TLV data object which includes the DNS IP address.

Preferably, the command header is specified in ETSI TS 102 221 and said Event list comprises a list events of variable types in which each event type shall not appear more than once within the list.

The DNS IP address may have either an IPv4 address type or IPv6 address type.

According to another aspect of the invention, if the type of the DNS address indicates IPv4, the address information in octet 4 to octet 7 contains the IPv4 address, bit 8 of octet 4 representing the most significant bit of the IP address, and bit 1 of octet 7 representing the least significant bit.

If the type of address indicates IPv6, the Address information in octet 4 to octet 19 contains the IPv6 address, bit 8 of octet 4 representing the most significant bit of the IP address, and bit 1 of octet 19 representing the least significant bit.

The invention claimed is:

1. Method for providing a UICC embedded in a wireless Mobile Equipment with an operator DNS IP address in a Wireless communication Network, method characterized by the following steps:
defining a specific Mobile Equipment event that the UICC may monitor,
defining a new data structure that will comprise the DNS IP address to be sent to the UICC,
registering the UICC to said event via predefined Setup Event List proactive command,
generating said specific event by said Mobile Equipment when a PDP context is activated between said Mobile Equipment and the Network,
including the DNS IP address in said new data structure,
sending said new data structure including the DNS IP address from the Mobile Equipment to the UICC via a new Envelop command when said generated event occurs,
adding a event "PDP Context Activated" in the "Event List" COMPREHENSION-TLV data object as defined in ETSI TS 102 223, adding a new Envelope command: (EVENT DOWNLOAD-PDP context activated), adding a new "DNS IP ADRESS" COMPREHENSION-TLV data object which includes the DNS IP address.

2. Method according to claim 1 wherein said DNS IP address is sent to the UICC via an ISO 7816 based interface.

3. Method according to claim 1 wherein said DNS IP address is encapsulated into USB data frames and sent to the UICC over a USB physical interface.

4. Method according to claim 1 wherein the command header is specified in ETSI TS 102 221.

5. Method according to claim 1 wherein said Event list comprises a list of events of variable types in which each event type shall not appear more than once within the list.

6. Method according to claim 1 wherein the DNS IP address may have either an IPv4 address type or IPv6 address type.

7. Method according to claim 6 wherein, if the parameter type of address indicates IPv4, the Address information in octet 4 to octet 7 contains the IPv4 address wherein bit 8 of octet 4 representing the most significant bit of the IP address and bit 1 of octet 7 representing the least significant bit.

8. Method according to claim 6 wherein if the parameter type of address indicates IPv6, the Address information in octet 4 to octet 19 contains the IPv6 address wherein bit 8 of octet 4 representing the most significant bit of the IP address and bit 1 of octet 19 representing the least significant bit.

* * * * *